Sept. 30, 1952  L. B. PAUL  2,612,616
VEHICLE HEADLIGHT
Filed Nov. 22, 1949
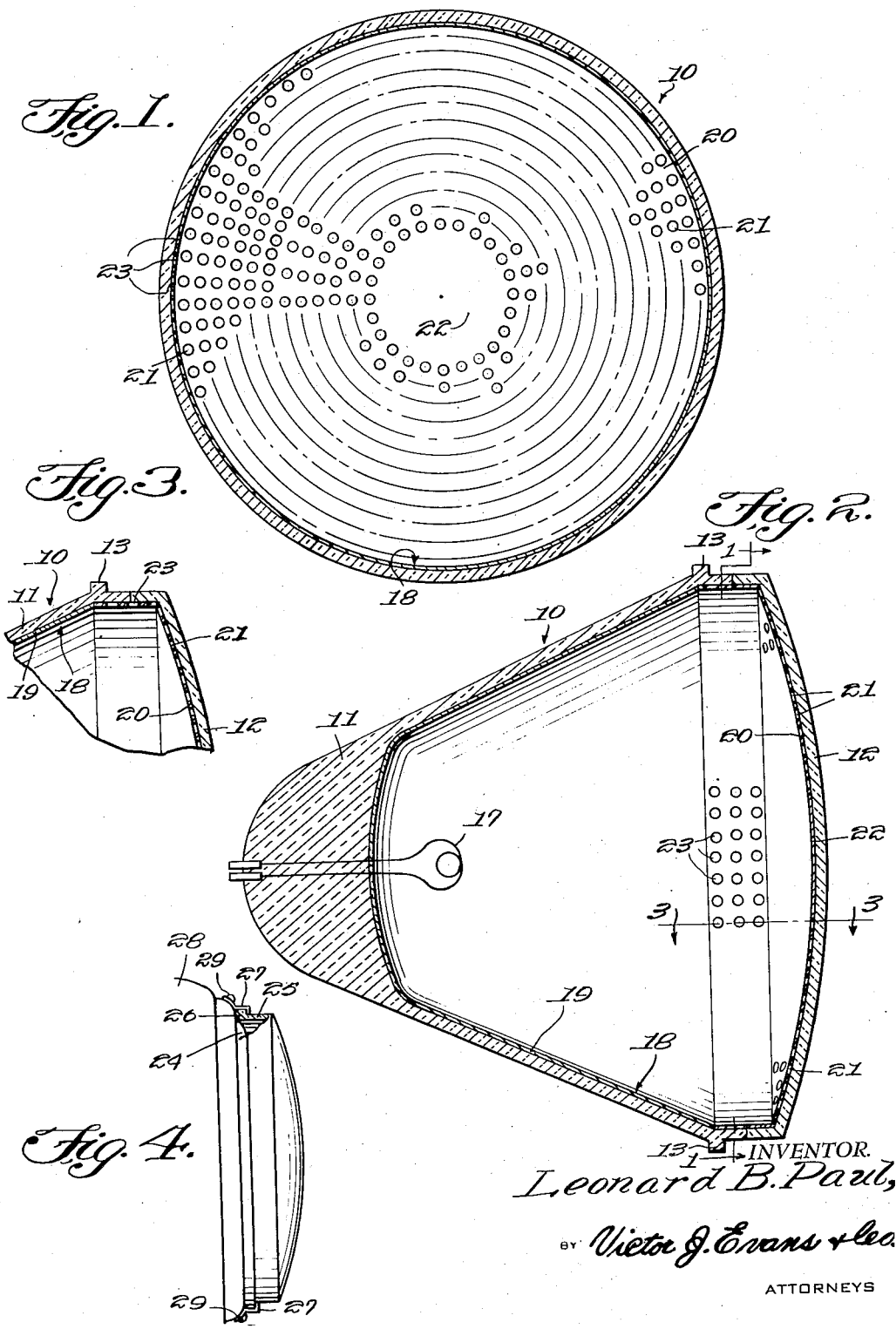
INVENTOR.
Leonard B. Paul,
BY Victor J. Evans + Co.
ATTORNEYS Patented Sept. 30, 1952

2,612,616

UNITED STATES PATENT OFFICE 2,612,616

VEHICLE HEADLIGHT

Leonard B. Paul, Joliet, Ill., assignor of one-fourth to Joseph Maichin and one-fourth to Emil Brusatori, both of Joliet, Ill.

Application November 22, 1949, Serial No. 128,700

4 Claims. (Cl. 313—117)

This invention relates to a vehicle headlight, and more particularly to an anti-glare device for vehicle headlights.

The object of the invention is to provide a vehicle headlight which may be readily applied with an anti-glare device whereby the light will be diffused to thereby eliminate glare without decreasing the amount of light emitted from the headlight.

Another object of the invention is to provide a headlight anti-glare device which includes a perforated front portion for diffusing the rays of light, the device further including a main reflecting body portion for reflecting and intensifying the rays of light that pass through the perforated front portion.

A further object of the invention is to provide a vehicle headlight anti-glare device which is extremely simple and inexpensive to manufacture.

Other objects and advantages will be apparent during the course of the following description.

In the accompanying drawings, forming a part of this application, and in which like numerals are used to designate like parts throughout the same;

Figure 1 is a transverse vertical sectional view through a headlight provided with the anti-glare device of the present invention;

Figure 2 is a longitudinal sectional view taken through a headlight equipped with the anti-glare device of the present invention;

Figure 3 is a fragmentary sectional view showing certain constructional details of the headlights;

Figure 4 is a side elevational view, with parts broken away and in section, showing a modified mounting for a vehicle headlight.

Referring in detail to Figures 1, 2 and 3 of the drawings, the numeral 10 designates a vehicle headlight which includes a base 11 and a lens 12 which is secured to the front of the base 11 by fusion or any other method. The base 11 is substantially conical in shape and arranged around the base 11 is an annular flange 13. Suitable clamps are adapted to be arranged in engagement with the annular flange 13 for maintaining the headlight 10 in proper position in the front of the vehicle.

The headlight 10 includes a source of light, such as a light bulb 17, which is adapted to be connected to a suitable source of electrical energy, such as the vehicle battery, and the present invention is directed to a device for preventing the headlight 10 from glaring. The anti-glare device of the present invention is designated generally by the numeral 18 and includes a body portion 19 that is snugly seated in the base 11, the body portion 19 having the same configuration as the base 11 of the headlight. A layer of reflecting paint is arranged on the inner surface of the body portion 19 for intensifying or reflecting the rays of light through the lens 12.

The anti-glare device of the present invention further includes a front portion 20 which is arranged contiguous to the inner surface of the lens 12, and the front portion 20 is provided with a plurality of spaced apertures or openings 21 for diffusing the rays of light emitted by the light source 17. The front portion 20 is also provided with a large central portion 22 which does not have openings therein, whereby glare from the bulb or electrode 17 will be prevented. Further, the anti-glare device of the present invention includes a plurality of spaced openings 23 adjacent the sides thereof, whereby rays of light will be emitted through the openings 23 to illuminate the sides of a road so that a vehicle can be safely driven along narrow roads and the like.

For securing the anti-glare device 18 to the headlight 10, the device is provided with an adhesive base which needs only to be moistened and then applied to the headlight, whereby the anti-glare device 18, which may be made of paper, will be secured to the base and to the lens 12.

Referring to Figure 4, there is shown an assembly whereby an anti-glare device is provided for a vehicle headlight 24 which may be of the sealed-beam type. To equip the headlight 24 of Figure 4 with the anti-glare arrangement, a lens 25 is arranged over the front of the headlight 24, the lens 25 being provided with an annular flange 26. Suitable clamps 27 are secured to the vehicle fender 28 by screws or rivets 29, the clamps engaging the flange 26 so as to maintain the lens 25 in place on the headlight 24. The lens 24 may be provided with the previously-described front portion 20, whereby light rays emitted by the headlight 24 will be diffused.

Further, instead of inserting or positioning the anti-glare device 18 in the headlight 10, the same result can be accomplished by painting the inside of the base 11 with suitable reflecting paint, such as the well known aluminum paint. Then, the inner surface of the lens 12 can be painted with a plurality of spaced white portions or dots leaving spaces between the white dots free for the emission therethrough of diffused light.

From the foregoing, it is apparent that an anti-glare device has been provided which can be readily installed in a vehicle headlight, such as the headlight 10. The anti-glare device is preferably secured to the base 11 and to the lens 12 by means of adhesive, and the front portion 20 of the anti-glare device is provided with a plurality of spaced openings 21 whereby the light rays emitted by the light source 17 will be diffused so as to eliminate glare. Further, the front portion 20 is provided with the large central portion 22 which will prevent glare from a bulb or other electrode. Also, the openings 23 in the sides of the anti-glare device will enable or permit illumination of the sides of the road during night driving. Also, the inner surface of the anti-glare device is painted with flat white eggshell reflecting enamel or paint so that the rays will be reflected back through the openings in the reflector device with great intensity.

What I claim:

1. As a new article of manufacture, an anti-glare device for a vehicle head light casing and lens fabricated of a single piece of paper like material and comprising a body portion having reflecting paint on its surface, a front portion for diffusing the light emitted by the head light and an adhesive base on said device whereby said device is secured to the interior surface of the casing and the rear face of the lens.

2. As a new article of manufacture, an anti-glare device for a vehicle head light casing and lens fabricated of a single piece of paper like material and comprising a body portion having reflecting paint on its surface, a front portion for diffusing the light emitted by the head light, said front portion being provided with a plurality of spaced openings therein and an adhesive base on said device whereby said device is secured to the interior surface of the casing and the rear face of the lens.

3. As a new article of manufacture, an anti-glare device for a vehicle head light casing and lens fabricated of a single piece of paper like material and comprising a body portion having reflecting paint on its surface, a front portion for diffusing the light emitted by the head light, said front portion being provided with a plurality of spaced perforations therein, there being a large unperforated central portion arranged centrally in said front portion, said device having openings in its sides for the passage therethrough of rays of light and an adhesive base on the device whereby said device is secured to the interior surface of the casing and the rear face of the lens.

4. In a vehicle head light, the combination with a conical-shaped base, a source of light supported by said base, and a transparent lens secured to the front of said base, of a device for preventing the head light from glaring, said device comprising a piece of paper like material shaped to define a body portion and having the same configuration as the interior of said base, a front portion provided with a plurality of spaced perforations for diffusing light emitted by said light source, there being a large unperforated central portion arranged centrally in said front portion, said device having a plurality of openings in its sides for the passage therethrough of rays of light, a layer of reflecting paint arranged on the inner surface of said body portion and a layer of adhesive arranged on the outer surface of said body portion whereby said body portion is secured to the rear surface of said base and lens.

LEONARD B. PAUL.

REFERENCES CITED

The following references are of record in the file of this patent:

UNITED STATES PATENTS

| Number | Name | Date |
|---|---|---|
| 1,510,724 | Waddicor | Oct. 7, 1924 |
| 1,522,252 | Luyties | Jan. 6, 1925 |
| 1,644,686 | Markel | Oct. 11, 1927 |
| 1,751,934 | Linton | Mar. 25, 1930 |
| 1,793,200 | Walthers | Feb. 21, 1931 |
| 1,864,271 | Hageman | June 21, 1932 |
| 1,747,635 | Jackson | Feb. 18, 1935 |

FOREIGN PATENTS

| Number | Country | Date |
|---|---|---|
| 348,065 | Germany | Jan. 25, 1922 |
| 347,482 | Great Britain | Apr. 30, 1931 |